(12) United States Patent
Duenner et al.

(10) Patent No.: US 11,295,236 B2
(45) Date of Patent: Apr. 5, 2022

(54) MACHINE LEARNING IN HETEROGENEOUS PROCESSING SYSTEMS

(71) Applicant: International Business Machines Corporation, Armonk, NY (US)

(72) Inventors: Celestine Duenner, Wettswil (CH); Thomas Parnell, Zürich (CH); Charalampos Pozidis, Thalwil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 693 days.

(21) Appl. No.: 16/214,639

(22) Filed: Dec. 10, 2018

(65) Prior Publication Data
US 2020/0184368 A1    Jun. 11, 2020

(51) Int. Cl.
G06N 20/00    (2019.01)
G06F 9/50    (2006.01)

(52) U.S. Cl.
CPC ........... *G06N 20/00* (2019.01); *G06F 9/5027* (2013.01)

(58) Field of Classification Search
CPC .............................. G06N 20/00; G06F 9/5027
See application file for complete search history.

(56) References Cited

U.S. PATENT DOCUMENTS

| | | | |
|---|---|---|---|
| 8,286,172 B2 | 10/2012 | Chakradhar et al. | |
| 10,970,629 B1* | 4/2021 | Dirac | G06N 3/04 |
| 2009/0171868 A1* | 7/2009 | Bottou | G06K 9/6269 |
| | | | 706/12 |
| 2014/0022548 A1* | 1/2014 | Lee | G01J 3/36 |
| | | | 356/402 |
| 2014/0142929 A1 | 5/2014 | Seide et al. | |
| 2017/0024643 A1* | 1/2017 | Lillicrap | G06N 3/006 |
| 2019/0068550 A1* | 2/2019 | Sheth | H04L 29/12641 |

(Continued)

OTHER PUBLICATIONS

Duenner et al., "Memory-Based Data Selection Scheme for Machine Learning Training on Limited Memory Resources," U.S. Appl. No. 15/953,440, filed Apr. 14, 2018.

(Continued)

*Primary Examiner* — Beau D Spratt
(74) *Attorney, Agent, or Firm* — Cantor Colburn LLP; Daniel Morris

(57) ABSTRACT

Computer-implemented methods are provided for implementing training of a machine learning model in a heterogeneous processing system that includes a host computer operatively interconnected to an accelerator unit. The training operation involves an iterative optimization process for optimizing a model vector defining the model. Such a method includes, in the host computer, storing a matrix of training data and partitioning the matrix into a plurality of batches of data vectors. For each of successive iterations of the optimization process, a selected subset of the batches is provided to the accelerator unit. In the accelerator unit, each iteration of the optimization process is performed to update the model vector in dependence on vectors in the selected subset for that iteration. In the host computer, batch importance values are calculated for respective batches. The batch importance value is dependent on contributions of vectors in that batch to sub-optimality of the model vector.

16 Claims, 3 Drawing Sheets

(56) References Cited

U.S. PATENT DOCUMENTS

2020/0242466 A1\* 7/2020 Mohassel ............ G06F 21/6254

OTHER PUBLICATIONS

Dünner et al., "Efficient Use of Limited-Memory Accelerators for Linear Learning on Heterogeneous Systems," 31st Conference on Neural Information Processing Systems, 2017, 18 pages.
Fischer et al., "Local Rejection Strategies for Learning Vector Quantization," International Conference on Artificial Neural Networks, 2014, pp. 563-570.
List of IBM Patents or Patent Applications Treated as Related; Date Filed: Dec. 10, 2018, 2 pages.

\* cited by examiner

MACHINE LEARNING IN HETEROGENEOUS PROCESSING SYSTEMS

BACKGROUND

The present invention relates generally to machine learning in heterogeneous processing systems. Methods are provided for implementing training of machine learning models in heterogeneous systems via an iterative optimization process, together with systems and computer program products for performing such methods.

Machine learning is a cognitive computing technique that allows a processing system to "learn" procedures for tackling complex tasks which are not programmed in a conventional manner Machine learning involves processing a (typically massive) dataset of training data from some real-word application in relation to a basic model for the application in order to train, or optimize, the model for the application in question. The model can then be applied to perform tasks based on new (unseen) data generated in that application. Machine learning techniques are used in numerous applications in science and technology. Some examples include computer vision, speech recognition, click-through rate prediction, medical diagnosis, genetic analysis, pharmaceutical drug design, and numerous applications in the field of computer networks such as intruder detection, email filtering, fault analysis and network maintenance.

Machine learning problems typically require optimization of some objective function of a training data matrix A and a model vector $\alpha$. The matrix A of training data is a d-by-n matrix having data elements $A_{j,i}$ with row coordinates j=1 to d and column coordinates i=1 to n. The model vector $\alpha$ is a length-n vector, having model elements $\alpha_i$, defining the model. The optimization process is an iterative procedure which repeatedly updates the model vector $\alpha$ until some convergence criterion is met. Various iterative optimization techniques, including stochastic optimization processes such as stochastic gradient descent and stochastic coordinate descent, can be used for the optimization. Stochastic coordinate descent in particular has been shown to achieve state-of-the-art performance when applied to machine learning problems such as linear regression, logistic regression and support vector machines. This technique works by approximating the global optimization problem as a series of sub-problems which optimize the objective with respect to a single coordinate (e.g. coordinate i corresponding to elements $\alpha_i$ of the model vector and column vectors of the matrix A) which is selected randomly at each iteration, while keeping the other coordinates fixed.

Machine learning involves inherently complex processing of typically very large datasets. It is a compute-intensive and time-consuming task, and can be a severe bottleneck for time-critical applications. Significant processing resources, usually provided by powerful processing systems using multi-core CPUs (central processing units), often with accelerators such as GPUs (graphics processing units) and FPGAs (field-programmable gate arrays), are required for practical operation. While accelerator devices can offer a significant increase in computational power due to their massively parallel architectures, their memory capacity is typically very limited. It is challenging to use such devices efficiently for data-intensive workloads, such as supervised training of large scale machine learning models, because the volume of training data often exceeds their memory capacity. If not carefully designed, the process can suffer heavily from memory bandwidth bottleneck between the host CPU and GPU memory.

One approach to the above issue is proposed in "Efficient Use of Limited-Memory Accelerators for Linear Learning on Heterogeneous Systems", Dünner et al., Advances in Neural Information Processing Systems (NIPS), 2017. This scheme calculates importance values for data vectors (here columns of matrix A) based on the coordinate-wise duality gap associated with each vector. The coordinate-wise duality gap represents the contribution of a particular coordinate vector to the overall duality gap which, in turn, provides a measure of sub-optimality of the model vector at a given stage of the optimization process. The importance values for vectors are stored in host memory. For each iteration of the optimization process, a three-step procedure is performed. Firstly, the most relevant subset of the data vectors in matrix A is selected based on the vector importance values. This involves a sorting operation to order the vector importance values. Next, the data vectors in GPU memory are updated to contain the selected vectors. The GPU then performs the optimization process to update the model vector $\alpha$ based on these vectors. In parallel with this GPU operation, the host evaluates the importance of individual data vectors and updates the importance values based on the (updated) model vector from a previous iteration.

The above scheme offers faster convergence by selecting the most relevant vectors for each iteration of the optimization process. However, the host-GPU memory bandwidth bottleneck is still a significant problem. Particularly for sparse data sets, this can severely degrade performance of the scheme.

SUMMARY

According to at least one embodiment of the present invention there is provided a method for implementing training of a machine learning model in a heterogeneous processing system, comprising a host computer operatively interconnected with an accelerator unit, via an iterative optimization process for optimizing a model vector defining the model. The method includes, in the host computer, storing a matrix of training data and partitioning the matrix into a plurality of batches of data vectors. For each of successive iterations of the optimization process, a selected subset of the batches is provided to the accelerator unit. The method further comprises, in the accelerator unit, performing each iteration of the optimization process to update the model vector in dependence on vectors in the selected subset for that iteration, and in the host computer, in parallel with each iteration in the accelerator unit, calculating batch importance values for respective batches. The batch importance value for each batch is dependent on contributions of vectors in that batch to sub-optimality of the model vector. The subset of batches for each iteration is selected by the host computer in dependence on the batch importance values.

Methods embodying the invention thus partition the training matrix so as to group multiple data vectors into batches. These batches are then processed as single data units. In particular, importance values are calculated and processed on a per-batch basis to determine the vectors provided to the accelerator unit for each iteration. A selected subset of the batches is provided for each iteration. An adaptive vector selection scheme based on importance values is thus provided, while alleviating the memory bandwidth bottleneck. Fewer data copy operations need to be issued in every iteration of the scheme because larger memory blocks, corresponding to whole batches, are updated compared to the prior scheme where copy commands are issued for individual vectors to be transferred over the host-accelerator interconnect. Where a given batch of vectors is selected for consecutive iterations, that whole batch need not be re-copied over the interconnect, further reducing the number of copy operations. Moreover, storing the importance values requires less memory in the host because the number of values corresponds to the number of batches and not the total number of data vectors. The process of selecting batches for each operation, e.g. by sorting the batch importance values, is also more efficient because fewer importance values need to be processed. Embodiments of the invention thus provide exceptionally efficient machine learning systems, offering significant efficiency improvements even for sparse data structures.

In embodiments of the invention, the batch importance value for each batch is dependent on the coordinate-wise duality gap associated with vectors in that batch. However, other importance measures can be envisaged as discussed further below.

The host computer may calculate the batch importance value for each batch by first calculating respective vector importance values for vectors in that batch, where each vector importance value is indicative of the contribution of that vector to sub-optimality of the model vector. The batch importance value is then calculated in dependence on the vector importance values. The batch importance value can be conveniently calculated as various functions of the vector importance values, e.g. based on (one or a combination of) an average, a maximum and a sum of the vector importance values. In some embodiments, vector importance values may be calculated for all vectors in the batch for maximum accuracy. In other embodiments, processing complexity can be reduced by calculating vector importance values for a random sub-sample of vectors in the batch.

In general, the subset of batches for each iteration may comprise one or more batches depending on batch size, bandwidth for memory copy operations, and the memory capacity of the accelerator unit for storing training data for each iteration. In embodiments of the invention, each subset comprises a plurality of batches. The size and number of batches can be selected to achieve a desired trade-off between the number of memory copy operations and the number of training iterations required for convergence.

In embodiments of the invention, data batches may be of different sizes. The host computer can partition the matrix into a plurality of batches of respective sizes dependent on the number of non-zero vector elements in the data vectors in each batch. The number of data vectors in different batches may be selected so that each batch contains roughly the same number of non-zero elements. This ensures that the amount of computation in the accelerator unit is approximately equal in each iteration for subsets with a fixed number of batches.

Respective further embodiments of the invention provide heterogeneous processing systems for implementing a method described above, and computer program products for causing a heterogeneous processing system to implement such a method.

In general, where features are described herein with reference to methods embodying the invention, corresponding features may be provided in systems/computer program products embodying the invention, and vice versa.

Embodiments of the invention will be described in more detail below, by way of illustrative and non-limiting example, with reference to the accompanying drawings.

DETAILED DESCRIPTION

Figure 1:
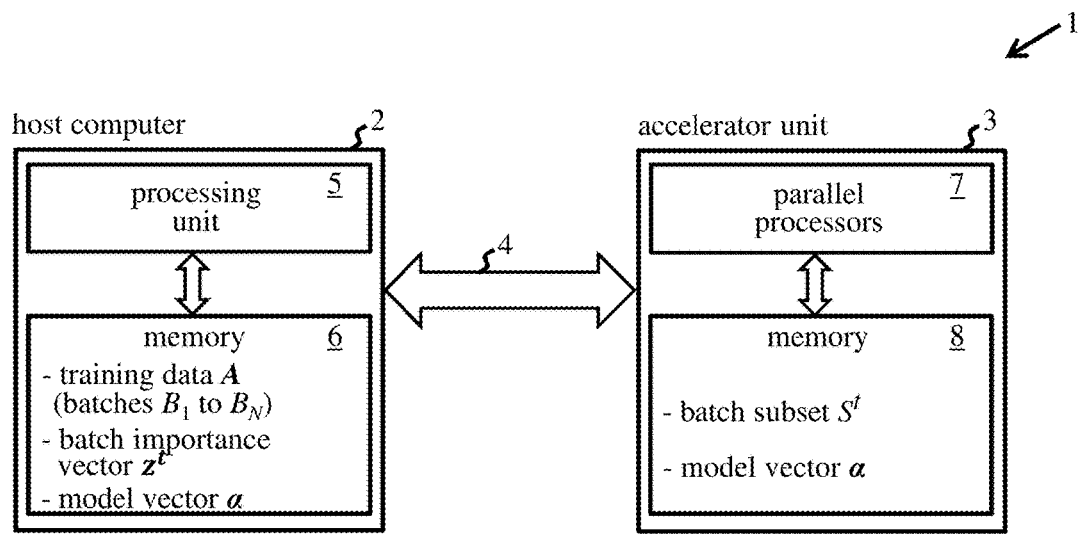
FIG. 1 is a schematic representing of a heterogeneous processing system embodying the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Methods embodying the invention implement training of machine learning models in heterogeneous processing systems via an iterative optimization process. The optimization process serves to optimize some objective function O of a training data matrix A and a model vector $\alpha$ defining the model. The matrix A of training data has d rows and n columns of data elements $A_{ji}$, with row coordinates j=1 to d and column coordinates i=1 to n. The model vector $\alpha$ is an n-dimensional vector with elements $\alpha_i$. The optimization process may be, for example, a stochastic optimization process such as stochastic gradient descent or stochastic coordinate descent. Such optimization processes are iterative processes which repeatedly update the model vector $\alpha$ until some convergence criterion is met. In computational steps of this process, the model vector is updated with respect to individual coordinates, e.g. coordinate i (corresponding to elements $\alpha_i$ of the model vector and columns vectors of the matrix A), which are processed in a random order in each iteration.

FIG. 1 is a schematic block diagram of a heterogeneous processing system for implementing methods embodying the invention. The system 1 comprises a host computer 2 which is operatively interconnected with an accelerator unit 3 via an interconnect indicated schematically at 4. Host computer 2 has a processing unit 5 which is operatively coupled to memory 6 of the host computer. The accelerator unit 3 has a set of parallel processors 7 which are operatively coupled to memory 8 of the unit. In the example shown, host memory 6 stores the training data matrix A for a training operation. This matrix is partitioned into batches $B_1, B_2, \ldots, B_N$ of data vectors as described below. For each iteration (or "epoch") t=0, 1, 2, etc., of the optimization process, a subset, denoted by $S^t$, of these batches is provided in accelerator memory 8 which has insufficient capacity for the entire matrix A. The subset $S^t$ for each epoch is selected by host 2 as detailed below based on a batch importance vector, denoted by z, stored in host memory 6. Host memory 6 and accelerator memory 8 also store the model vector $\alpha$ which is successively updated in each epoch t.

In an exemplary implementation of system 1, host 2 comprises a multi-core CPU and accelerator 3 comprises a GPU. The GPU has an array of streaming multiprocessors, e.g. CUDA (Computer Unified Device Architecture) cores, for parallel processing of multiple GPU thread blocks. Interconnect 4 can be implemented via an NVLink interconnect architecture. Such a system can leverage CUDA streams for asynchronous copying of data between the host and GPU over the multichannel NVLink interconnect. In general, however, host computer 2 may be implemented by a general- or special-purpose computing apparatus, and processing unit 5 may comprise one or more processors, e.g. general-purpose CPUs. In embodiments of the invention, processing unit 5 comprises at least one multi-core CPU. Accelerator unit 3 may in general comprise one or more GPUs, FPGAs or other similar devices which offer high-speed parallel processing capabilities. Such an accelerator unit may be internal or external to host computer 2. Interconnect 4 may comprise one or more communication links or buses, implementing any convenient communications protocol, depending on the particular architecture of system 1. System 1 may also include various additional elements not shown explicitly in the figure. For example, host 2 and accelerator 3 may include components such as memory controllers, processor caches, interfaces for interconnect 4, and so on.

Figure 2:
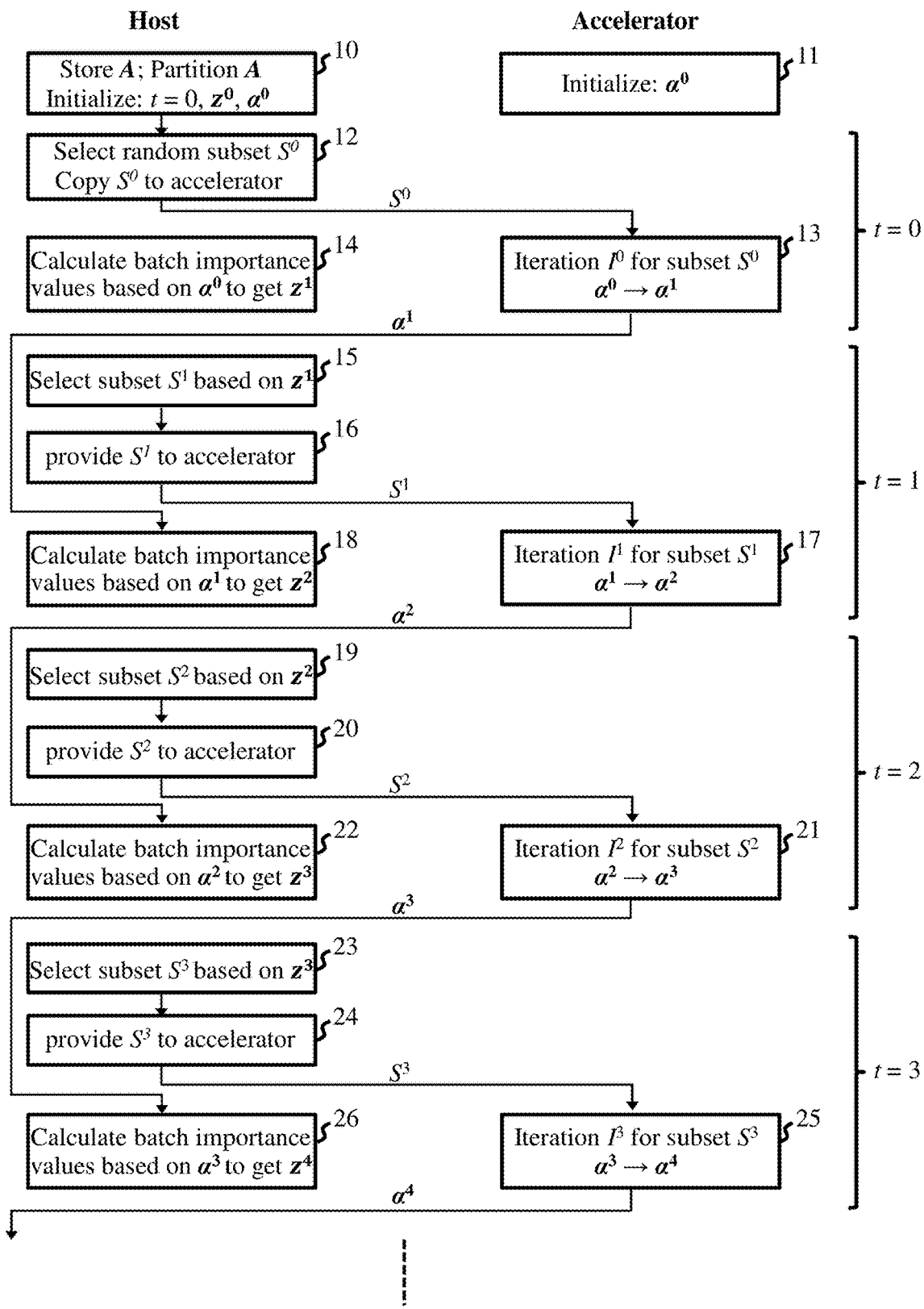
FIG. 2 indicates operational steps of a training operation performed by the FIG. 1 system.

FIG. 2 indicates basic steps of a model training operation in system 1. The left-hand column indicates steps performed by host computer 2. Steps performed by accelerator 3 are shown in the right-hand column, and steps performed in parallel are laterally aligned in the figure. Steps 10 and 11 represent initialization steps in the host and accelerator respectively. As indicated in step 10, the host computer stores the training data matrix A in memory 6 and then partitions this matrix into a plurality of batches $B_1$ to $B_N$ of data vectors. This partitioning is illustrated schematically in FIG. 3. In this example, each batch $B_b$ (b=1 to N) contains a plurality of column vectors, denoted by $a_i$, of the matrix A. Batches $B_b$ may contain different numbers of vectors. In embodiments of the invention, the host 2 partitions the matrix into batches of respective sizes dependent on the number of non-zero vector elements $A_{ji}$ in the data vectors $a_i$ in each batch. In particular, host 2 defines the batches so that all batches contain approximately equal numbers of non-zero elements $A_{ji}$. The assignment of data vectors to batches $B_b$ remains fixed for the training operation.

Figure 3:
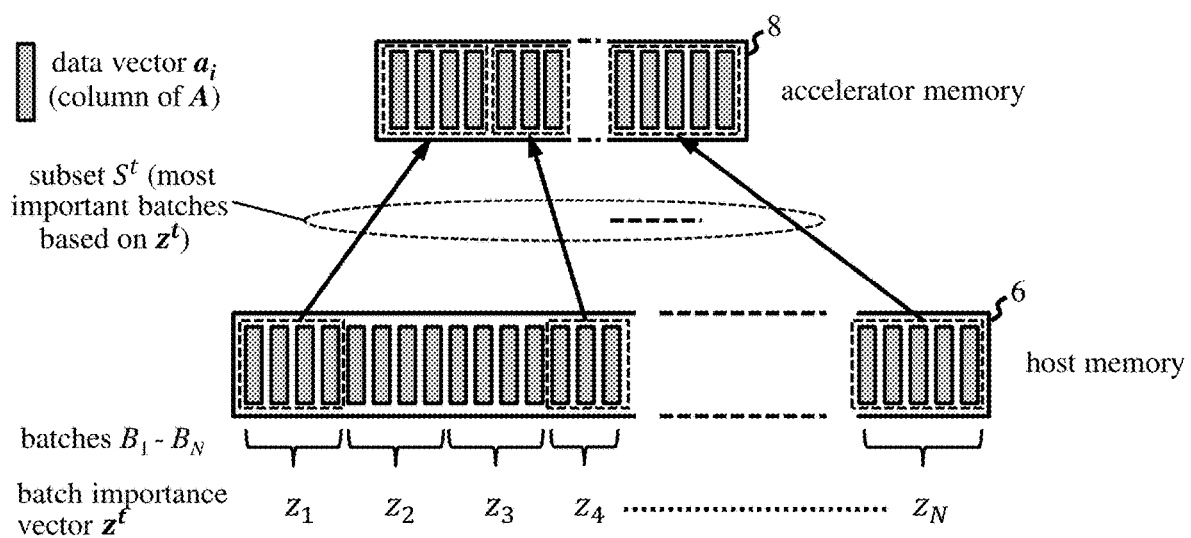
FIG. 3 illustrates provision of training data to an accelerator unit in operation of the system.

Also in step 10, host 2 sets the epoch counter t to t=0, and initializes the batch importance vector $z^t$. This batch importance vector $z^t$ is an N-dimensional vector having elements (batch importance values) $z_b$, b=1 to N, corresponding to respective batches $B_b$ as indicated in FIG. 3. For the first epoch, this vector is initialized such that all vector elements are equal, e.g. to $z^0=0$. The model vector $\alpha^t$ for iteration t=0 is initialized, e.g. to $\alpha^0=0$, in host 2, and also in accelerator unit 3 in step 11.

In step 12, the host 2 initially selects a random subset $S^0$ of the data batches $B_1$ to $B_N$ to be copied to accelerator 3. This subset $S^0$ is copied over interconnect 4 to accelerator memory 8. In step 13, accelerator 3 performs an iteration $I^0$ of the optimization process for epoch t=0 to update the model vector in dependence on the data vectors $a_i$ in subset $S^0$. This process is performed in known manner according to the particular optimization process employed. The model vector updates for individual coordinates i can be calculated in an asynchronous parallel fashion to fully exploit the parallel processing resources of accelerator 2, with the updates for all coordinates being aggregated for the subset $S^0$. The model vector is thus updated from $\alpha^0$ to $\alpha^1$, and the updated model vector $\alpha^1$ is returned to host 2. In parallel with processing iteration 13 in accelerator 3, the host computer calculates batch importance values $z_b$ for respective batches $B_b$ in step 14. The batch importance value $z_b$ for a batch is dependent on contributions of vectors $a_i$ in that batch to sub-optimality of the initial model vector $\alpha^0$. The batch importance value calculation, which may be performed for some or all batches $B_b$, is described in more detail below. The batch importance vector is updated from $z^0$ to $z^1$ with the newly-calculated elements $z_b$.

In step 15, host 2 selects a subset $S^1$ of the data batches $B_1$ to $B_N$ to be provided to accelerator 3 for the next epoch t=1. This subset $S^1$ is selected in dependence on the batch importance values $z_b$ in vector $z^1$. The most important batches, as indicated by the current importance values $z_b$, can be selected in this step as explained further below. The accelerator memory is updated with subset $S^1$ in step 16. In step 17, the accelerator performs iteration $I^1$ of the optimization process to update the model vector from $\alpha^1$ to $\alpha^2$ in dependence on the data vectors $a_i$ in subset $S^1$. In parallel with this, in step 18, the host computer again calculates batch importance values $z_b$ for respective batches $B_b$. Here, the batch importance value $z_b$ for a batch is dependent on contributions of vectors $a_i$ in that batch to sub-optimality of the model vector $\alpha^1$ after processing step 13. The batch importance vector is updated from $z^1$ to $z^2$ with the newly-calculated elements $z_b$.

Steps 19 to 22 for epoch t=2 then correspond to steps 15 to 18 respectively for epoch t=1. Hence, host 2 selects the next subset $S^2$ based on batch importance values in $z^2$, and the accelerator performs iteration $I^2$ for subset $S^2$ to update the model vector to $\alpha^3$. The host, in parallel, calculates batch importance values $z_b$ to update the batch importance vector to $z^3$ based on the model vector $\alpha^2$.

The operation continues in this way for successive iterations of the optimization process in accelerator 3, with batch importance values being updated in parallel in the host based on the (updated) model vector from a previous iteration. The iterative operation continues until convergence is detected. Host 2 or accelerator 3 may check for convergence after each epoch. The convergence criterion can be defined as desired for a given operation, e.g. as a specified number of epochs, or as obtaining a change in a specified value (such as the objective function O evaluated for $\alpha^t$, or the maximum change in a component of $\alpha^t$) that is less than a defined threshold. The optimized model vector $\alpha^t$ output on convergence defines the trained model.

The above process provides an adaptive vector-selection scheme for machine learning operations based on dynamically-calculated importance values for predetermined batches of vectors. Batches are processed as single data units based on these batch importance values. An efficient training process based on importance values is therefore provided, while alleviating the memory bandwidth bottleneck between host and accelerator. Compared to the prior scheme discussed earlier: operation requires fewer data copy commands per iteration; storing the importance values requires less memory in the host; and the batch selection process is less complex as there are fewer importance values to process. Also, when providing a selected subset of batches to the accelerator for each iteration, any selected batch already in accelerator memory need not be recopied over interconnect 4, further reducing demands on interconnect bandwidth. These features offer exceptionally efficient machine learning systems.

The importance value calculation (step 18 and similar in FIG. 2) is described in more detail below for an embodiment of the above scheme. Here, the batch importance value $z_b$ for a batch $B_b$ is dependent on the coordinate-wise duality gap associated with vectors $a_i$ in that batch. As is well known in the art, the duality gap is a measure of the difference between the primal and dual solutions to an optimization problem, and provides a measure of sub-optimality of a model vector at a given stage of the optimization process. The coordinate-wise duality gap indicates the contribution of a particular coordinate vector to the duality gap and hence to sub-optimality of the model vector. This in turn indicates the potential of a vector to improve the model. The coordinate-wise duality gap is explained in the Dünner reference above for the widely-applicable optimization problem:

$$\underset{\alpha}{\mathrm{argmin}} O(\alpha) = f(A\alpha) + g(\alpha),$$

where $g(\alpha) = \Sigma_{i=1}^n g(\alpha_i)$, $\alpha \in \mathbb{R}^n$, and $A = [a_1, a_2, \ldots, a_n] \in \mathbb{R}^{d \times n}$ is the training matrix with column vectors $a_i \in \mathbb{R}^d$. Briefly, for a primal-dual vector solution pair $(\alpha, w)$, the duality gap gap(α) can be expressed as a sum of coordinate-wise duality gaps $gap_i(\alpha_i)$ associated with the individual coordinates, i.e. $gap(\alpha)=\sum_{i=1}^{n}gap_i(\alpha_i)$, where: $gap_i(\alpha_i)=w^T a_i \alpha_i + g_i(\alpha_i) + g_i^*(-a_i^T w)$. Here, T denotes the vector transpose and g* denotes the convex conjugate of the function g.

Figure 4:
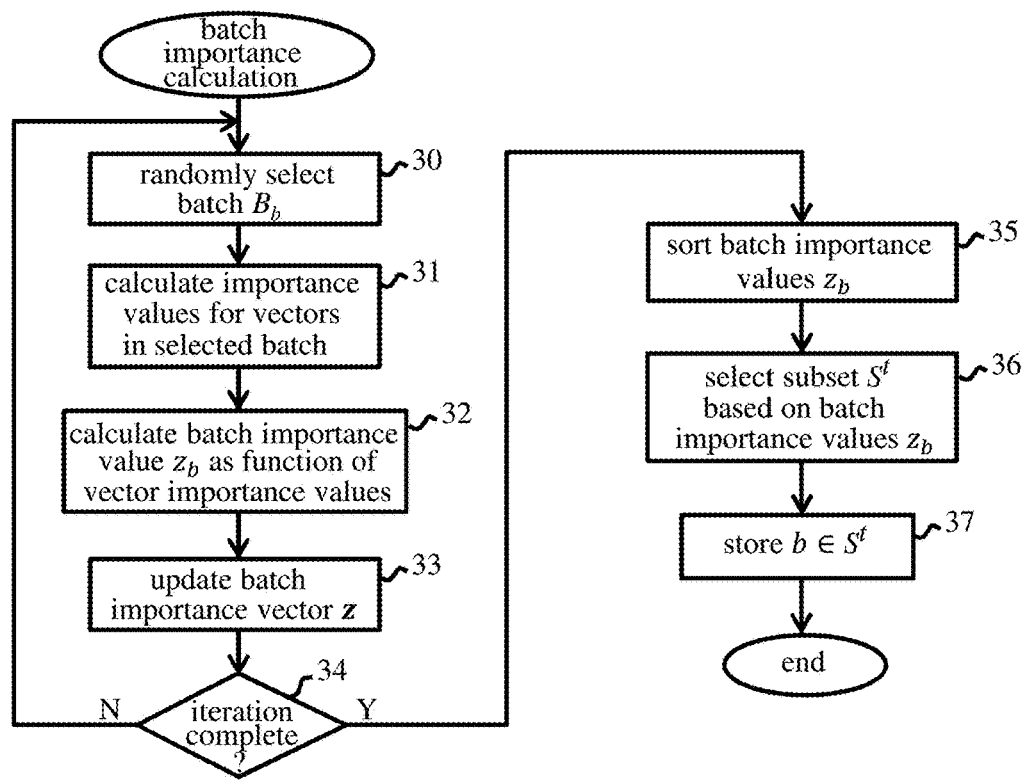
FIG. 4 illustrates more detailed steps performed by a host computer in an embodiment of the system.

FIG. 4 indicates steps of the importance value calculation procedure in host 2 for this embodiment. In step 30, host 2 randomly selects a batch $B_b$. In step 31, the host calculates respective vector importance values for each vector in that batch. The vector importance value is calculated here as the coordinate-wise duality gap for that vector. In step 32, the host then calculates the batch importance value $z_b$ in dependence on the vector importance values, i.e. $z_b=F(gap_i(\alpha_i))$, $i \in B_b$. Various functions F may be used here. Examples include a maximum, or a sum, of the individual vector importance values $gap_i(\alpha_i)$, or an average (e.g. a mean, mode or median) of the vector importance values, or a combination of one or more such quantities. In step 33, the host updates the batch importance vector z with the new value for $z_b$. In decision step 34, the host determines whether the accelerator has completed the current processing iteration and returned the updated model vector. If not ("No" (N) at step 34), operation reverts to step 30 where the host randomly selects another batch $B_b$ and proceeds to calculate $z_b$ for that batch. (Note that, while the figure illustrates sequential calculation of importance values for different batches, in practice these values can be calculated in an asynchronous parallel fashion in a multi-core CPU of the host).

If the accelerator has finished the current processing iteration ("Yes" (Y) at step 34), then operation proceeds to step 35. Here, the host sorts the batch importance values $z_b$ in the updated vector z in order of importance, i.e. higher to lower values $z_b$. The order of indices b of the sorted values thus indicates the order of importance of the batches. In step 36, the host selects a predetermined number of batches having the highest importance values, indicative of the largest contributions to sub-optimality of the model vector, as the subset $S^t$ for the next iteration. In step 37, the indices $b \in S^t$ of the selected batches is stored by the host, and the operation is complete. The selected subset $S^t$ will then be provided to accelerator 3 as described above. By storing the indices b of the selected batches in step 37, the host can compare the selected subset with that for the previous iteration. Only those batches not already in accelerator memory need then be copied over interconnect 4 for the next iteration.

With the above procedure, not all batch importance values may be updated in each iteration. Batch importance values are calculated for randomly-selected batches until the accelerator unit has completed its current processing iteration. This ensures efficient use of accelerator resources for the training operation while ensuring that batch importance values of all batches will be updated with a non-zero probability.

By defining batches as described earlier so that all batches contain approximately the same number of non-zero data elements, each subset $S^t$ can contain a fixed number of batches while ensuring that the amount of computation in accelerator 3 is approximately equal for each iteration. In general, a subset $S^t$ could contain one or more batches. However, batch size can be selected so that a subset $S^t$ contains a plurality of batches. The particular batch size, and number of batches per subset, can be selected as desired based on parameters such as memory capacity of the accelerator, interconnect bandwidth, and size of the data matrix A for a given training operation. Smaller batch size offers potentially greater relevance of vectors processed in each iteration at the expense of increased memory copy operations per iteration. This trade-off can be tuned as desired to meet requirements for a given training operation and maximize efficient use of system resources.

In a modification to the FIG. 4 process, the importance value calculation can be made more efficient in the host by calculating vector importance values for only a random sub-sample of vectors in each batch.

Numerous other modifications and alternatives can be envisaged to the above embodiments. For example, while FIG. 2 illustrates a pipelined procedure in which a subset $S^t$ is copied to the accelerator between processing iterations, operation can be adapted so that, while the accelerator performs a processing iteration on a current subset, the next subset is copied in parallel to a buffer memory of the accelerator. Selection of the subset for a given iteration is then based on an earlier version of the model vector, but the accelerator can proceed immediately with processing one subset after another.

While the batch importance values above are based on coordinate-wise duality gaps of constituent vectors of a batch, any quantity indicative of vector contributions to sub-optimality of the model vector may be used in other embodiments. For example, in a stochastic gradient descent process, a value based on the norm of the step projected on the direction of the respective coordinate could be used as a coordinate-wise importance measure. Similarly, for the case where a data vector corresponds to a training example, a value based on the norm of the respective stochastic gradient could be used as an importance measure. Other values based on importance sampling techniques can also be envisaged here.

In general, the matrix of training data stored by host 2 may be all or a portion of the complete training dataset for a model training operation. For example, a model training system may comprise a network of host-plus-accelerator sub-systems, with each host storing a respective subset of the data vectors in matrix A. Each sub-system may then operate generally as described above to update particular coordinates of the model vector corresponding to the coordinate vectors stored by the host. Model vector updates may be exchanged between sub-systems as required, e.g. between each processing iteration. Convergence can be checked for after each iteration t, e.g. by a system controller or one of the sub-systems which is designated as a master in the system.

Depending on formulation of the optimization problem for a training operation, the batches of training data may comprise either row or column vectors of the training matrix A. Also, while subsets are selected based on importance values in consecutive iterations of the optimization process above, embodiments may be envisaged in which subsets are selected for every $r^{th}$ successive iteration, where r>1.

Steps of the training process in systems embodying the invention can be implemented by program instructions, e.g. program modules, executed by a processing apparatus of the system. Generally, program instructions may include routines, programs, objects, components, logic, data structures, and so on that perform particular tasks or implement particular abstract data types. The processing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 5:
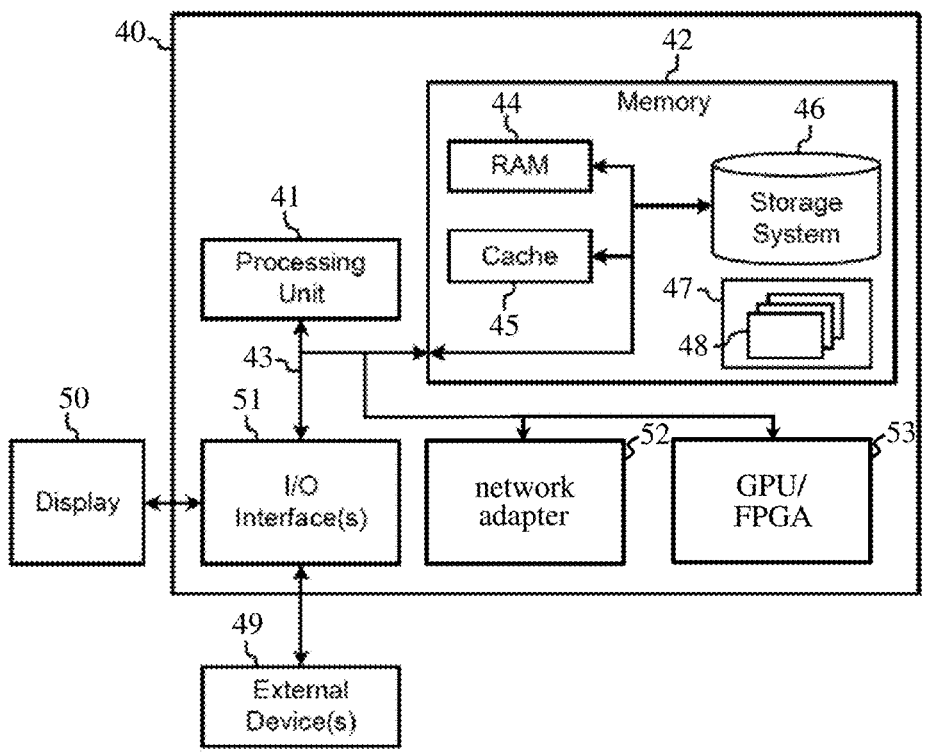
FIG. 5 is a generalized schematic of a computer system for implementing embodiments of the invention.

The block diagram of FIG. 5 shows an exemplary computing apparatus for implementing a processing system embodying the invention. The apparatus is shown here in the form of a general-purpose computing device 40. The components of computer 40 may include processing apparatus such as one or more processors represented by processing unit 41, a system memory 42, and a bus 43 that couples various system components including system memory 42 to processing unit 41.

Bus 43 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 40 typically includes a variety of computer readable media. Such media may be any available media that is accessible by computer 40 including volatile and non-volatile media, and removable and non-removable media. For example, system memory 42 can include computer readable media in the form of volatile memory, such as random access memory (RAM) 44 and/or cache memory 45. Computer 40 may further include other removable/non-removable, volatile/non-volatile computer system storage media. By way of example only, storage system 46 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 43 by one or more data media interfaces.

Memory 42 may include at least one program product having one or more program modules that are configured to carry out functions of embodiments of the invention. By way of example, program/utility 47, having a set (at least one) of program modules 48, may be stored in memory 42, as well as an operating system, one or more application programs, other program modules, and program data. Each of the operating system, one or more application programs, other program modules, and program data, or some combination thereof, may include an implementation of a networking environment. Program modules 48 generally carry out the functions and/or methodologies of embodiments of the invention as described herein.

Computer 40 may also communicate with: one or more external devices 49 such as a keyboard, a pointing device, a display 50, etc.; one or more devices that enable a user to interact with computer 40; and/or any devices (e.g., network card, modem, etc.) that enable computer 40 to communicate with one or more other computing devices. Such communication can occur via Input/Output (I/O) interfaces 51. Also, computer 40 can communicate with one or more networks such as a local area network (LAN), a general wide area network (WAN), and/or a public network (e.g., the Internet) via network adapter 52. As depicted, network adapter 52 communicates with the other components of computer 40 via bus 43. Computer 40 can also communicate with additional processing apparatus 53, such as a GPU or FPGA, implementing an accelerator unit in embodiments of the invention. It should be understood that although not shown, other hardware and/or software components could be used in conjunction with computer 50. Examples include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for training a machine learning model in a heterogeneous processing system comprising a host computer operatively interconnected with an accelerator unit, the computer-implemented method using an iterative optimization process for optimizing a model vector defining said model, the computer-implemented method comprising:
   in the host computer, storing a matrix of training data and partitioning the matrix into a plurality of batches of data vectors;
   for each of successive iterations of the optimization process, providing a selected subset of said batches to the accelerator unit;
   in the accelerator unit, performing each iteration of the optimization process to update the model vector in dependence on vectors in said selected subset for that iteration; and
   in the host computer, in parallel with each iteration in the accelerator unit, calculating batch importance values for respective batches, the batch importance value for each batch being dependent on contributions of vectors in that batch to sub-optimality of the model vector, wherein the batch importance value for each batch is dependent on the coordinate-wise duality gap associated with vectors in that batch;
   wherein said subset of batches for each iteration is selected by the host computer in dependence on said batch importance values including:
   sorting the importance values for the batches; and
   selecting for said subset one or more batches having importance values indicative of the largest contributions to sub-optimality of the model vector.

2. The computer-implemented method as claimed in claim 1, wherein said subset of batches for each iteration comprises a plurality of batches.

3. The computer-implemented method as claimed in claim 1 further including, in the host computer, calculating the batch importance value for each batch by:
   calculating respective vector importance values for vectors in that batch, the vector importance value for a vector being indicative of the contribution of that vector to sub-optimality of the model vector; and
   calculating the batch importance value in dependence on said vector importance values.

4. The computer-implemented method as claimed in claim 3 further including calculating vector importance values for all vectors in the batch.

5. The computer-implemented method as claimed in claim 3 further including calculating vector importance values for a random sub-sample of vectors in the batch.

6. The computer-implemented method as claimed in claim 3 further including calculating the batch importance value in dependence on at least one of an average, a maximum and a sum of said vector importance values.

7. The computer-implemented method as claimed in claim 3, wherein the vector importance value for each vector comprises the coordinate-wise duality gap associated with that vector.

8. The computer-implemented method as claimed in claim 1 further including, in the host computer, calculating batch importance values for randomly-selected batches until the accelerator unit has completed said iteration of the optimization process.

9. The computer-implemented method as claimed in claim 1, wherein the host computer partitions said matrix into a plurality of batches of respective sizes dependent on the number of non-zero vector elements in the data vectors in each batch.

10. A heterogeneous processing system for training a machine learning model via an iterative optimization process for optimizing a model vector defining said model, the system comprising a host computer, for storing a matrix of training data, which is operatively interconnected with an accelerator unit, wherein the heterogeneous processing system is adapted such that:
- the host computer partitions said matrix into a plurality of batches of data vectors;
- for each of successive iterations of the optimization process, a selected subset of said batches is provided to the accelerator unit;
- the accelerator unit performs each iteration of the optimization process to update the model vector in dependence on vectors in said selected subset for that iteration; and
- the host computer, in parallel with each iteration in the accelerator unit, calculates batch importance values for respective batches, the batch importance value for each batch being dependent on contributions of vectors in that batch to sub-optimality of the model vector, wherein the batch importance value for each batch is dependent on the coordinate-wise duality gap associated with vectors in that batch;
- wherein said subset of batches for each iteration is selected by the host computer in dependence on said batch importance values including:
  - sorting the importance values for the batches; and
  - selecting for said subset one or more batches having importance values indicative of the largest contributions to sub-optimality of the model vector.

11. The system as claimed in claim 10, wherein the host computer is adapted to calculate the batch importance value for each batch by:
- calculating respective vector importance values for vectors in that batch, the vector importance value for a vector being indicative of the contribution of that vector to sub-optimality of the model vector; and
- calculating the batch importance value in dependence on said vector importance values.

12. The system as claimed in claim 11, wherein the vector importance value for each vector comprises the coordinate-wise duality gap associated with that vector.

13. The system as claimed in claim 11, wherein the host computer is adapted to calculate batch importance values for randomly-selected batches until the accelerator unit has completed said iteration of the optimization process.

14. The system as claimed in claim 10, wherein the accelerator unit comprises at least one graphics processing unit.

15. The system as claimed in claim 10, wherein the accelerator unit comprises at least one field-programmable gate array.

16. A computer program product for training a machine learning model in a heterogeneous processing system comprising a host computer operatively interconnected with an accelerator unit, via an iterative optimization process for optimizing a model vector defining said model, said computer program product comprising a non-transitory computer readable storage medium having program instructions embodied therein, the program instructions being executable by the processing system to cause the system to perform a method comprising:
- in the host computer, storing a matrix of training data and partitioning the matrix into a plurality of batches of data vectors;
- for each of successive iterations of the optimization process, providing a selected subset of said batches to the accelerator unit;
- in the accelerator unit, performing each iteration of the optimization process to update the model vector in dependence on vectors in said selected subset for that iteration; and
- in the host computer, in parallel with each iteration in the accelerator unit, calculating batch importance values for respective batches, the batch importance value for each batch being dependent on contributions of vectors in that batch to sub-optimality of the model vector, wherein the batch importance value for each batch is dependent on the coordinate-wise duality gap associated with vectors in that batch;
- wherein said subset of batches for each iteration is selected by the host computer in dependence on said batch importance values including:
  - sorting the importance values for the batches; and
  - selecting for said subset one or more batches having importance values indicative of the largest contributions to sub-optimality of the model vector.

* * * * *